United States Patent
Guillouet

Patent Number: 5,882,061
Date of Patent: Mar. 16, 1999

[54] MECHANISM FOR ADJUSTING THE ANGULAR POSITION OF AN ARM HINGED ON A SUPPORT

[75] Inventor: Erwan Guillouet, Flers, France

[73] Assignee: Bertrand Faure Equipments S.A., Boulogne Cedex, France

[21] Appl. No.: 850,014

[22] Filed: May 1, 1997

[30] Foreign Application Priority Data

May 10, 1996 [FR] France .................................. 96 06036

[51] Int. Cl.⁶ ...................................................... B60N 2/16
[52] U.S. Cl. .................................. 296/65.05; 296/65.07; 296/687.1; 297/344.15; 74/89.18; 248/548; 248/422; 248/421
[58] Field of Search .............................. 296/65.01, 65.06, 296/65.05, 65.07, 65.08, 65.09, 68.1; 297/330, 344.17, 344.15; 248/421, 422, 423, 548, 900, 292.12; 74/89.18, 89.19

[56] References Cited

U.S. PATENT DOCUMENTS

| | | | |
|---|---|---|---|
| 4,720,070 | 1/1998 | Nishino | 248/421 |
| 5,022,707 | 6/1991 | Beauvais et al. | 296/68.1 |
| 5,199,679 | 4/1993 | Nakamura et al. | 248/421 |
| 5,470,129 | 11/1995 | Ferrero | 297/330 |
| 5,636,884 | 6/1997 | Ladetto et al. | 296/65.09 |
| 5,782,533 | 7/1998 | Fischer et al. | 297/344.15 |

FOREIGN PATENT DOCUMENTS

| | | |
|---|---|---|
| 0 577 517 | 1/1994 | European Pat. Off. . |
| 2354215 | 1/1978 | France . |
| 2596337 | 10/1987 | France . |
| 2652043 | 3/1991 | France . |
| 2118031 | 10/1983 | United Kingdom . |

Primary Examiner—D. Glenn Dayoan
Assistant Examiner—Kiran Patel
Attorney, Agent, or Firm—Pollock, Vande Sande & Amernick

[57] ABSTRACT

A system for adjusting the height of automobile vehicle seats having an arm of the mechanism which is hinged on a support around a hinge shaft. It is formed of two elements connected by a pivot and at least a connecting member with a predetermined rupture load. One of the elements includes a main set of teeth in the form of an arc of a circle centred on the hinge shaft and the other element includes a secondary set of teeth with same centre. A pinion located between the two sets of teeth meshes only with the main set of teeth when the two elements of the arm are securely attached. In case of an excessive load on the arm, the connection is broken and the secondary set of teeth meshes with the pinion subsequent to the relative pivoting of the two elements and prevents the rotation of the pinion.

11 Claims, 7 Drawing Sheets

MECHANISM FOR ADJUSTING THE ANGULAR POSITION OF AN ARM HINGED ON A SUPPORT

FIELD OF THE INVENTION

This invention concerns a mechanism for adjusting the angular position of an arm hinged on a support, of the type including a toothed circular segment attached to the said arm and having as the center of curvature the hinge axis of the arm, and meshing with a pinion currently used as control component for the angular movement of the said arm.

BACKGROUND OF THE INVENTION

Such mechanisms are in particular used for automobile vehicle seats for adjusting the height of these seats. In such an application, the seat is attached to the floor of the vehicle or, more precisely, to the slides attached to the floor, for adjusting the forward-rearward position of the seat, by links hinged on the seat and the said slides respectively. These links are more or less parallel and comprise the two sides of a deformable quadrilateral of a form close to that of a parallelogram. The pivoting of these links therefore especially causes a vertical movement of the seat. Conventionally, only one of these links is comprised of an arm of the type concerned by the invention where the pivoting is controlled, the other link necessarily following the movement of the controlled arm. Seat height adjustment is achieved by rotating the pinion of the mechanism which causes, by meshing with the toothed segment, the pivoting of the hinged arm and therefore a vertical movement of the seat. Conventionally, the drive pinion is installed on the seat, the center of curvature of the circular toothed segment then being located at arm hinge axis on the seat. The operation would however be similar if the center of the toothed segment was located at the hinge axis of the arm on the slide and if the pinion was installed on the said slide.

We know of a seat height adjustment system including such an arm equipped with a toothed segment with external teeth. The pinion meshing with this toothed segment is rotated either manually, or by an electric motor and a reduction gear. On account of the reversibility of the pinion-toothed segment system, the seat is held in the position selected by the user by means ensuring the rotational locking of the said pinion. When control is ensured by motor and reduction gear, this locking can be ensured for example by means of an unreversible reduction gear, for example of the worm screw type. The rotational locking of the pinion can also be ensured by locks. Seat height adjustment systems also exist where the seat is pushed upwards by a spring. In this case, the pinion does not drive the toothed segment but only locks it in position. Adjustment is achieved, after having unlocked the pinion, by pressing the seat against the action on the spring, or by retaining it, until desired position is reached and retention in selected position is ensured by then relocking the pinion.

In all cases, the loads exerted on the seat and retransmitted to the links and the floor connecting arm are supported by the pinion locking means. These loads can be very high if the vehicle is subjected to a shock or involved in an accident. The components ensuring this locking must therefore be oversized, to avoid the rotation of the pinion under the effect of the torque generated by these loads, in comparison with that which would be sufficient in terms of mechanical strength to ensure the normal operation of the mechanism. The result is substantial overall dimensions and weight for these items and high costs.

BRIEF DESCRIPTION OF THE INVENTION

The purpose of this invention is to solve the problems stated above and in particular aims at ensuring the efficient positional locking of the arms of the mechanisms mentioned above in case of loads on these exceeding those normally encountered during current use without the need to oversize the locking components.

With these targets in mind, the subject of the invention is a mechanism for adjusting the angular position of an arm hinged on a support around a hinge axis, of the type including a toothed circular segment attached to the said arm and meshing with a pinion installed so as to rotate on the said support, characterized in that the arm is formed of two elements connected by at least one pivot with an axis parallel to the hinge axis and at least one connecting member with predetermined strength so that the connection ensured by the said connecting member is broken when the pivoting torque of one of the said elements in relation to the other, around the said pivot, exceeds a predetermined threshold, and in that at least one of the said elements includes a main set of teeth in the form of an arc of a circle with its center of curvature located at the hinge axis and the other element includes at least a secondary set of teeth in the form of an arc of a circle with the same center, one of the sets of teeth being an internal set of teeth and the other an external set of teeth, the pinion being located between the two said sets of teeth, the radial distance between the said sets of teeth being determined so that the pinion meshes only with the main set of teeth when the two elements of the arm are security attached by the connecting member and the second set of teeth meshes with the pinion following a relative pivoting of the two said elements when the connection ensured by the connecting member is broken.

A first element of the arm is hinged on the support and the second element extends the first element away from the said hinge point and its end includes for example a second hinge point on the part or the member to be moved in relation to the said support. When the mechanism according to the invention is used to adjust the height of an automobile seat, the first element is for example hinged to the frame of the seat, which also bears the pinion and its control and/or rotational locking means, and the second element is hinged by its end to the slide of the seat.

When an excessive load is exerted on the end of the arm opposite arm hinge point on the support, this load induces a pivoting torque for the two elements of the arm, one on the other, around the pivot axis. Above the predetermined threshold, this torque causes the rupture of the connection ensured by the connecting member allowing the relative rotation of these elements around the pivot and causes the second set of teeth to enter into contact with the pinion. The pinion then engages with the two sets of teeth, in diametrically opposite areas and, as these two sets of teeth cannot move in relation to each other on account of the connection of the two elements ensured by the pivot, the pinion is jammed between these sets of teeth and cannot rotate.

The complete load supported by the arm is then transmitted, via the said sets of teeth, to the pinion, then to its guide bearing and, from there, directly to the arm support without any torque being transmitted to the pinion drive or rotational locking components. These components can therefore be sized so as to support only the normal loads to which they are submitted during current use therefore allowing the overall dimensions and costs to be reduced in relation to systems of earlier design without this being detrimental to the locking safety required in case of excessive loads.

Note that the pivot is located outside of the geometrical sector which has the hinge axis for its center and which covers the said sets of teeth, so as to allow the sets of teeth to move towards one each other during the relative pivoting of the two elements of the arm. The axis of the pivot could be for instance, and not restrictively, located in the vicinity of a plane tangent to the arc of the circle of one or the other set of teeth or in the vicinity of the circle centered on the hinge axis and passing via the pinion.

According to a preferential arrangement, the main set of teeth is the internal set of teeth, located on the other side of the hinge point with respect to the pinion. The said internal set of teeth, comprising the main set of teeth, has a radius of curvature greater than the external set of teeth which comprises the second set of teeth. This arrangement is favorable, for a given overall size of the mechanism and of the pinion drive and pinion support, for obtaining, during normal use of the mechanism, a higher arm pivoting torque for a given pinion driving torque or, conversely, for reducing the torque transmitted by the teeth to the pinion and therefore for also reducing the overall size of the pinion and its driving and rotational locking means.

Preferentially, each of the elements of the arm includes an internal set of teeth and an external set of teeth, the two internal sets of teeth and the two external sets of teeth being located so that they correspond exactly, one beside the other, when the two elements are connected together by the connecting member. Thus, if this connection breaks, an internal set of teeth of one element will always move towards the external set of teeth of the second element, irrespective of the relative pivoting direction of the elements and therefore irrespective of the direction of the load exerted on the end of the arm.

Again, preferentially, in this case, the internal and external sets of teeth of a given element are made respectively on the opposing curved sides of a window having a form of an arc of a circle made in the said element.

The second set of teeth, which does not mesh with the pinion when the two elements are solidly attached, does not, on account of the fact that it is used only to block the pinion in case of excessive loads on the arm, need to ensure real correct mechanical meshing with the pinion. The teeth of this set of teeth can therefore be smaller than the teeth of the main set of teeth and, at limit, be simply grooves sufficient to prevent the rotation of the pinion by the engagement of these grooves with the teeth of the pinion. Note, also, that if the pitch of the secondary set of teeth is high, for example equal to that of the main set of teeth, a slight rotation of the pinion remains possible before the teeth of the secondary set of teeth correctly engage with the teeth of the pinion. If the pitch of the secondary set of teeth is smaller than the module of the pinion and the main set of teeth then, when the connection between the two elements of the arm breaks, this rotation and the pivoting of the arm will be limited ensuring a faster reaction in the blocking of the pinion.

Depending on the direction of the pivoting torque exerted on the end of the arm, the relative movements of the two elements at pinion level are not exactly equivalent. In effect, the pinion and the hinge axis of the first element of the arm are installed on the same support and therefore with a determined distance between their axes, ensuring normal meshing of the main set of teeth of the first element with the pinion. In one direction, the pivoting of the second element in relation to the first one will simply move the secondary set of teeth of the second element towards the pinion and thus ensure locking. However, in the other direction, it is the main set of teeth of the second element which will push the pinion until it engages with the secondary set of teeth of the first element. Therefore, in this case, slight movement of the pinion bearing is required over a distance sufficient so that the pinion can engage with the secondary set of teeth of the first element. For this purpose, we can provide deformable means for attaching the pinion bearing to the support, this attachment being defined so that it deforms only under excessive loads. For example, the bearing of the pinion can be installed in a bore made in an mounted collar made from the sheet metal comprising the support and, to allow the said movement in case of excessive load, the installed collar can be split so that it will distort and open under a high load thus allowing the pinion to move.

According to another design intended to eliminate the need for the movement of the pinion bearing in the case stated above, the two arm elements are connected by two pivots located on either side of a plane passing through the hinge axis and the sets of teeth, each of the said pivots being connected to one of the elements and with possibility of relative movement in relation to the other element along a trajectory describing an arc of a circle centered on the other pivot. In this design, the relative pivoting of one element in relation to the other, in case of rupture of the connection between the said elements, will be achieved around either one or the other of the pivots according to the direction of the torque exerted on the end of the arm.

According to a particular arrangement, the two pivots are solidly attached to one of the elements and pass through oblong holes made in the other element and allowing the said relative movement.

On account of the fact that the length of the lever arm between the end of the arm and the pivot point is then different according to the direction of the said torque, as the active pivot is not the same in both cases, two connecting components will be preferentially provided, associated with each pivot respectively, and the mechanical strength of each determined so that the connection will be broken for more or less the same load exerted on the end of the arm irrespective of the direction of this load.

The invention will be easier to understand and other characteristics and advantages will appear in the description which will follow, as an example, of two designs of a mechanism in compliance with the invention for adjusting the height of the seat of an automobile vehicle.

BRIEF DESCRIPTION OF THE DRAWINGS

Refer to appended drawings on which.

DETAILED DESCRIPTION OF THE DRAWINGS

Figure 1:
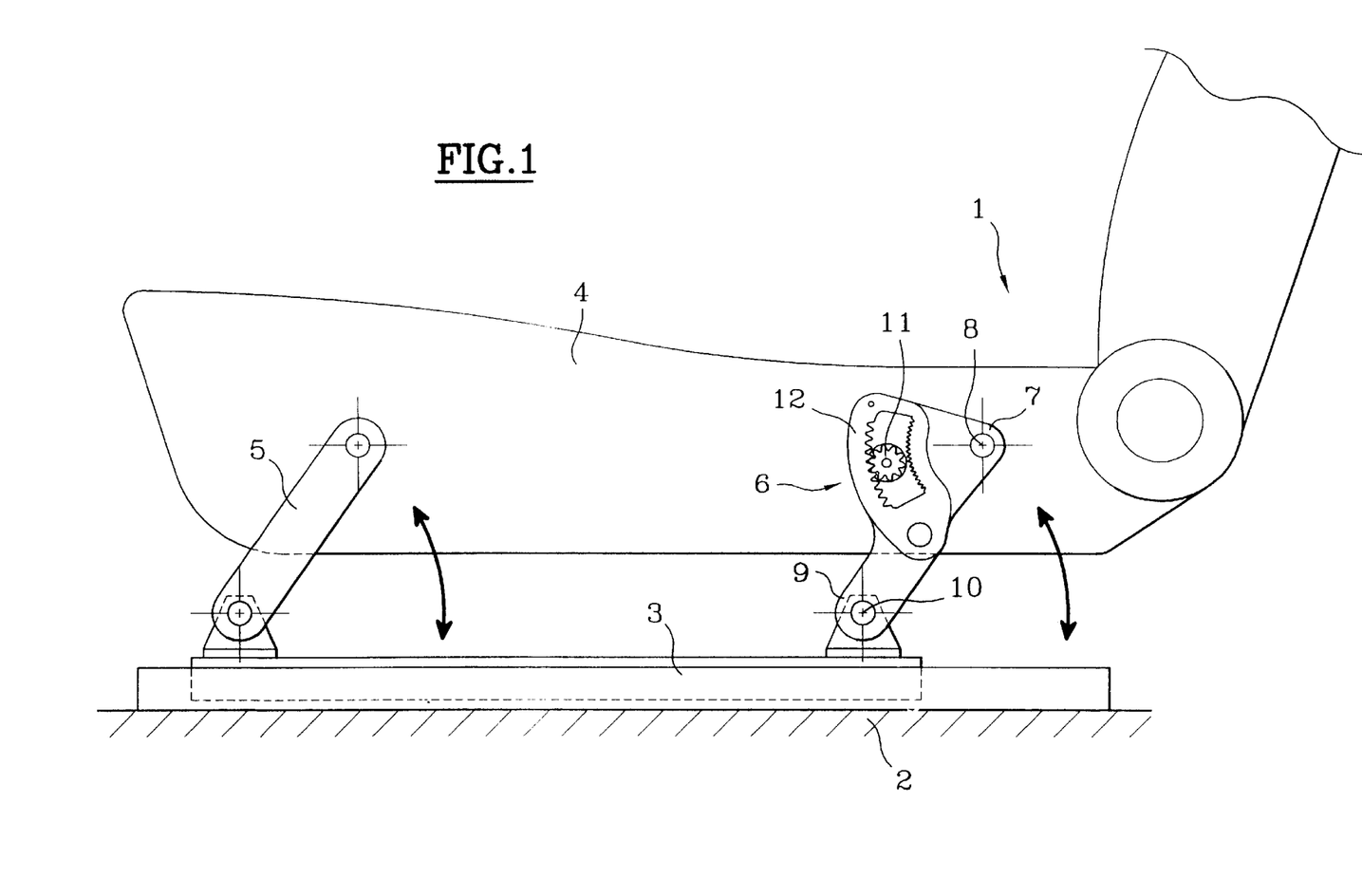
FIG. 1 shows a lateral view of the principle of a seat height adjustment system.

The drawing on FIG. 1 schematically shows a seat 1 attached to the floor 2 of the vehicle by means of slides 3. To achieve seat height adjustment, the frame, not shown, of seat 4 is connected to the movable part of the slide 3 by links 5 and arms 6 hinged to form, with the slide and the said frame, a deformable parallelogram. An end 7 of the arm 6 is installed so as to pivot on a hinge shaft 8 connected to the seat, and the second end 9 of the arm is hinged at 10 on a lug attached to the moving part of the slide 3.

The angular position of the arm 6 is adjustable by a pinion 11 meshing with a toothed segment 12 attached to the arm 6. The pinion 11 is installed in fixed position on the seat 4. The pinion 11 can be rotated either by a manual handle or by an electric motor and a reduction gear. The seat can also include a spring system pushing the seat upwards, height adjustment then being achieved simply by pressing the seat against the action of these springs, or by retaining it, to place it in the position required by the user. Irrespective of the case, retention in selected position, in normal utilization, is always ensured by rotational locking of pinion 11 which thus prevents arm 6 from pivoting.

Figures 2, 9:
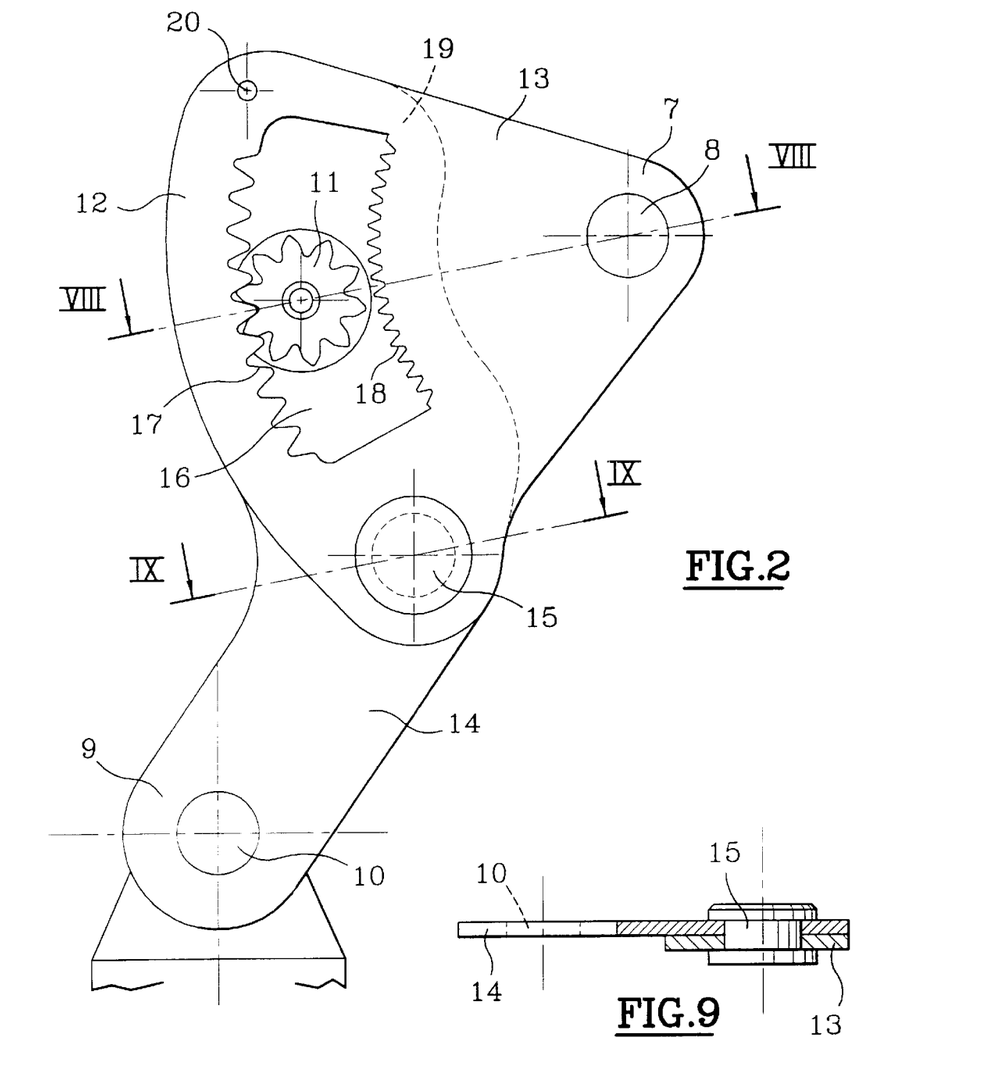
FIG. 2 shows the mechanism, according to a first design and in normal service position.
FIG. 9 shows a cross-section view through line IX—IX on FIG. 2.
Figure 3:
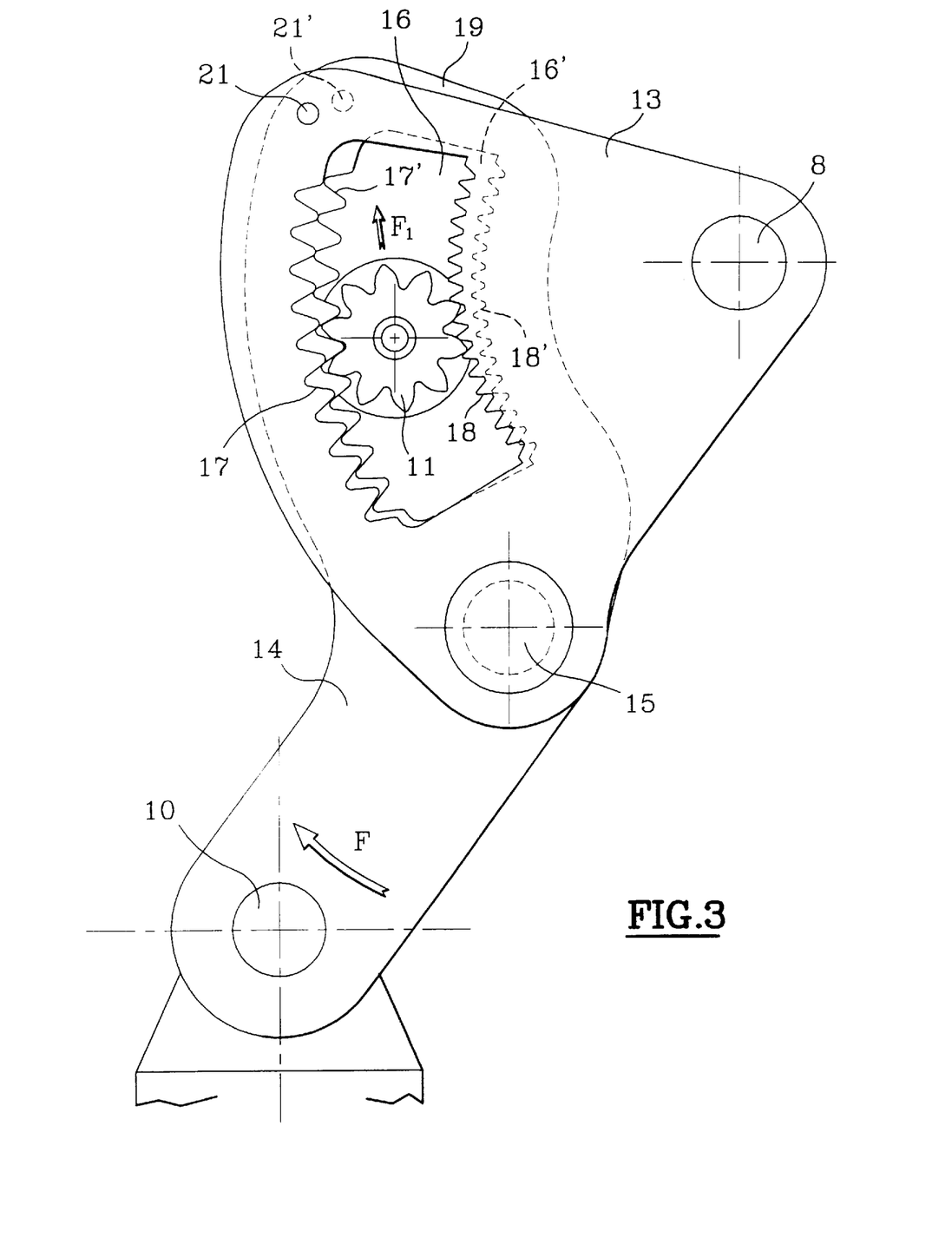
FIG. 3 shows the mechanism in blocked position following an excessive load caused, for example, by a shock of the vehicle in the direction corresponding to the lowering of the seat.
Figure 4:
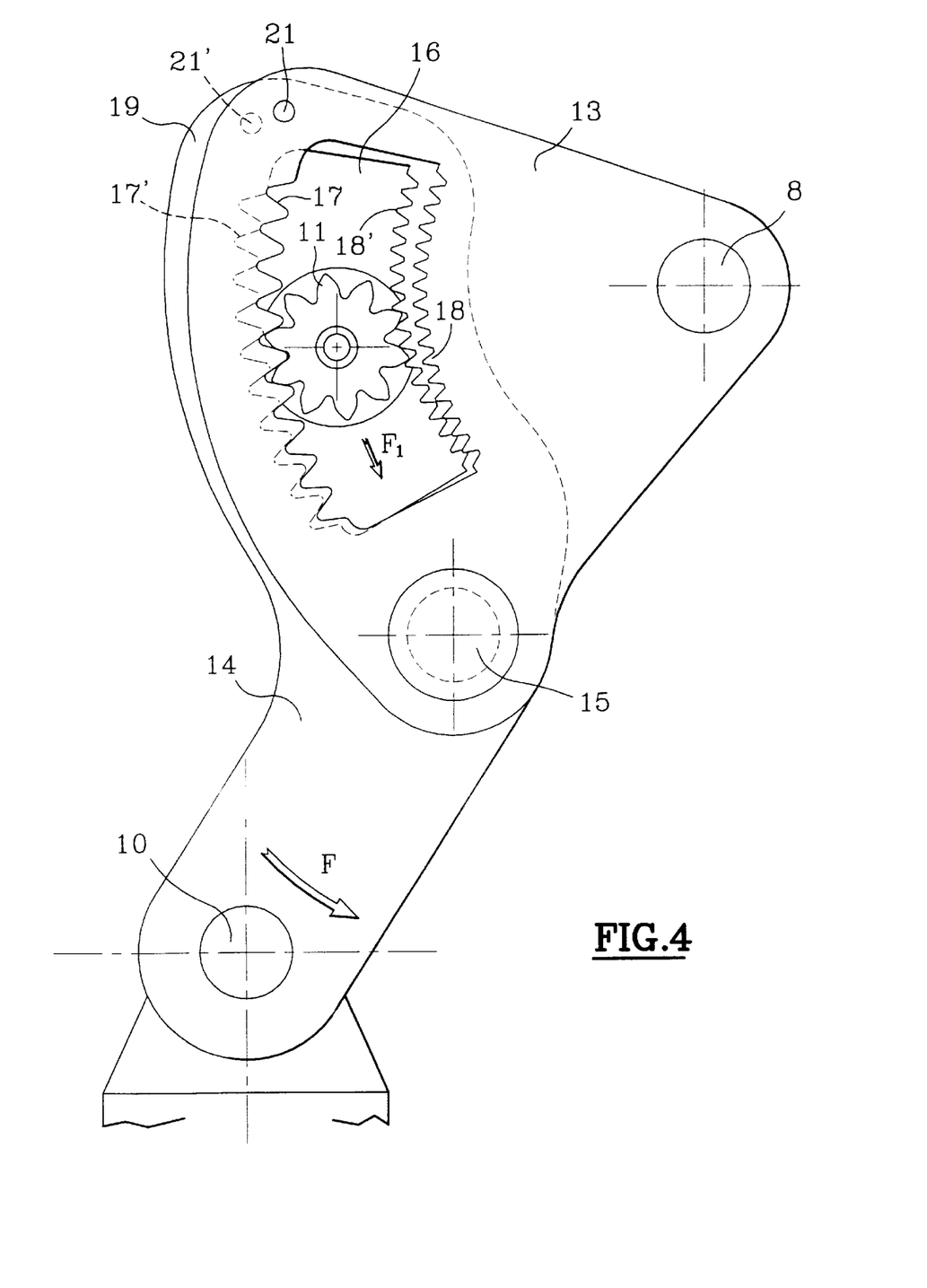
FIG. 4 shows the mechanism in blocked position following an excessive load in the opposite direction.

In relation to FIGS. 2 to 4, we will now describe in more detail the design of the arm 6 in compliance with the invention. Arm 6 includes a first element 13 comprised, for example, of a metal sheet of triangular or disc sector form, extending in a plane perpendicular to the hinge shaft 8 and forming an upper half-arm, hinged on the said hinge shaft 8, and a second element 14, extending parallel against the first element and forming a lower half-arm hinged on the hinge shaft 10 of the slide. The two elements are hinged in relation to each other by a pivot 15 with an axis parallel to hinge points 8 and 10, consisting for example of a rivet or similar maintaining the two elements against each other as can be seen on FIG. 9, this pivot being located for example more or less in line with the axes of the said hinge points and at mid-distance between the latter. This arrangement of the various axes is however not restrictive as can be easily understood by the explanation which will follow concerning the operation of the mechanism.

Figure 8:
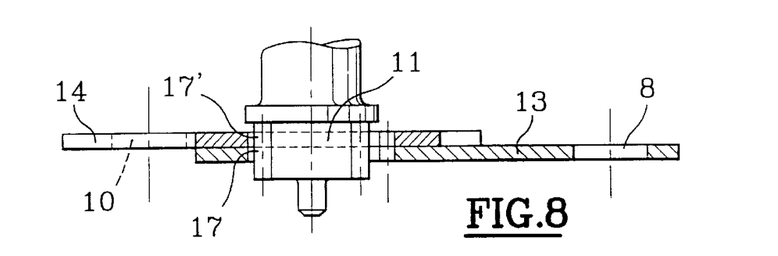
FIG. 8 shows a cross-section view through line VIII—VIII on FIG. 2.

A window 16 in the form of an arc of a circle centered on the hinge shaft 8 is made in the first element 13, more or less at same distance from the hinge shaft 8 and the pivot 15. An internal set of teeth 17 is made on the curved edge of this window 16 which is the farther from the hinge shaft 8, and forms the toothed segment 12. An external set of teeth 18 is made on the other curved edge of the window, situated nearer the hinge pin 8. A similar window 16', equipped with corresponding sets of teeth 17' and 18', is made in a portion 19 of the second element 14 which extends adjoining the first element so that, in the normal service position of the mechanism shown on FIG. 2, the sets of teeth 17, 17' and 18, 18' respectively exactly coincide. The pinion 11 is located in the said windows 16, 16' and meshes both with the internal sets of teeth, or main sets of teeth, 17 and 17' of the two elements, as can be seen on FIG. 8. The width of the windows 16, 16', that is the radial distance between the internal sets of teeth, 17, 17' and the external sets of teeth, 18, 18' is greater than the diameter of the pinion 11 so that the external sets of teeth, or the secondary sets of teeth 18, 18' are not in contact with the pinion 11 in the position shown on FIG. 2 and do not hinder its rotation. These secondary sets of teeth serve no purpose during the normal utilization of the mechanism and can for example be made with a module half that of the main set of teeth or even smaller.

To prevent the relative pivoting of the two elements 13 and 14 around the pivot 15 in normal utilization, they are attached elsewhere by a connecting member, consisting here of a shear pin 20 fitted into two holes 21, 21' made in the first and second element respectively at a distance from the pivot 15, for example on side of the windows 16, 16', opposite the said pivot. The material and the dimensions of the shear pin 20 are determined so that the shear pin will shear at the interface between the two elements 13 and 14 if the relative pivoting torque of the said elements around the pivot 15 exceeds a predetermined value. Once the shear pin 20 has broken, the two elements 13 and 14 can pivot in relation to each other around the axis of the pivot 15 ensuring the locking of the mechanism by preventing all rotation of the pinion as we will now see in relation to FIGS. 3 and 4.

The drawing on FIG. 3 shows the position of the mechanism after the shearing of the shear pin 20 caused by an excessive load inducing on the end 9 of the arm a torque in the direction of arrow F. Subsequent to the rupture of shear pin 20, the second element 14 has pivoted around the pivot 15, so that portion 19 of the second element moves towards hinge point 8. In doing this, the main set of teeth 16' of the second element 14 has pushed the pinion 11 until it comes into contact with the second set of teeth 18 of the first element 13, the teeth of the pinion engaging in the teeth of the secondary set of teeth. Blocked in this way between the main set of teeth 17' of the second element and the secondary set of teeth 18 of the first element, all rotation of the pinion is impossible and, instead of the torque F is transformed into a rotational torque of the pinion on itself, which would be supported by the pinion drive and rotational locking components, only a force F1 remains perpendicular to the axis of the pinion and transmitted integrally to the frame of the seat on which the pinion is installed.

The drawing on FIG. 4 shows the position of the mechanism in case where the load exerted on the arm is in the direction opposite to the case shown on FIG. 3 and we can easily understand that the rotational blocking of pinion 11 is achieved in a similar manner except that, in this case, the pinion is gripped between the main set of teeth 17 of the first element 13 and the secondary set of teeth 18' of the second element 14.

Note that in the case shown on FIG. 4, the pinion 11 being already engaged with the main set of teeth 17 of the first element 13 before the shear pin 20 ruptures, this rupture has caused the set of teeth 18' of the second element 14 to bear on the teeth of the pinion practically without causing the movement of the latter whereas in the case shown on FIG. 3 the pinion is pushed by the second element towards the secondary set of teeth of the first element and, to enable this movement, the pinion must be installed on the frame of the seat in such a way that it allows this movement.

Figure 5:
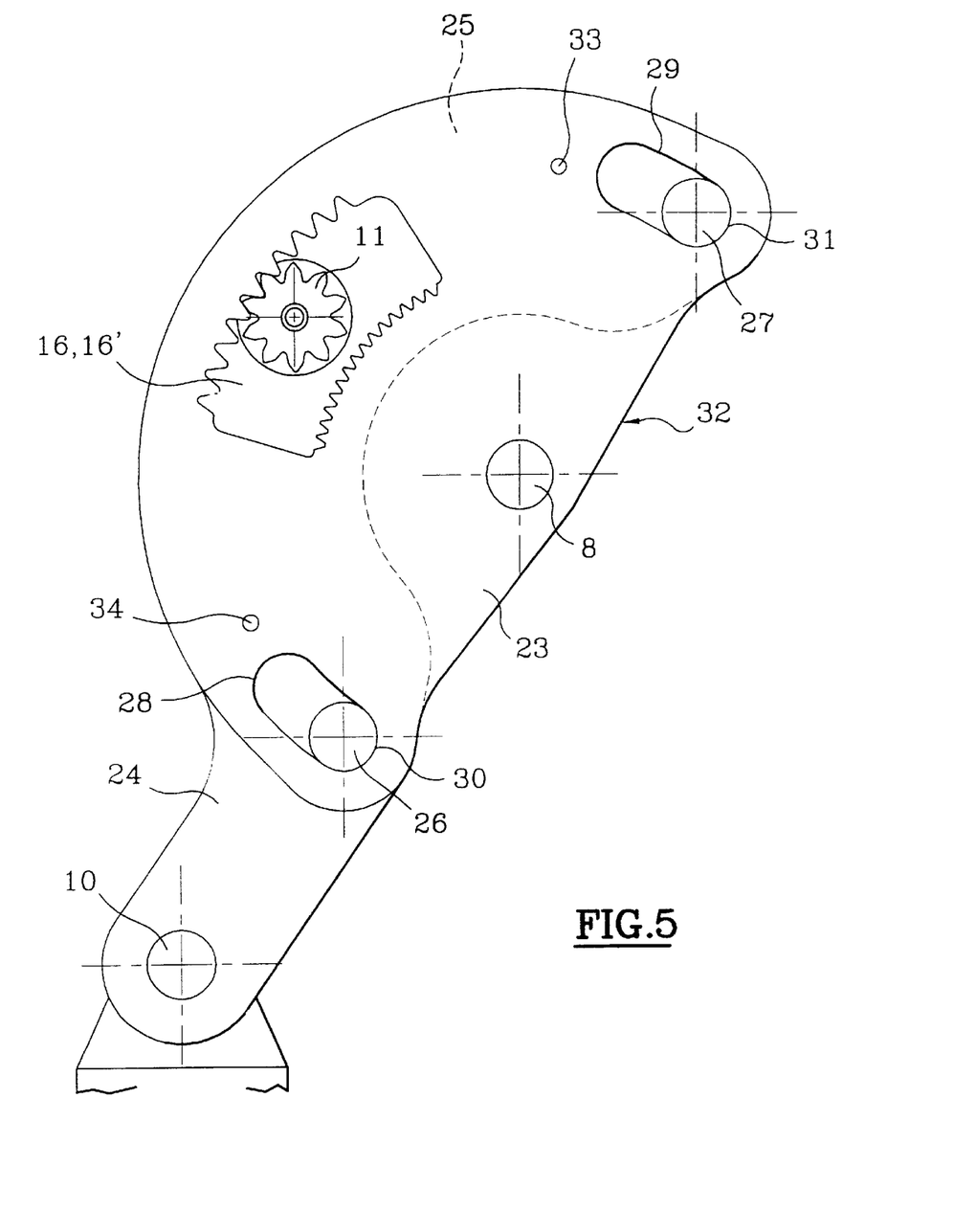
FIG. 5 shows a second design in the normal service position of the mechanism.
Figure 6:
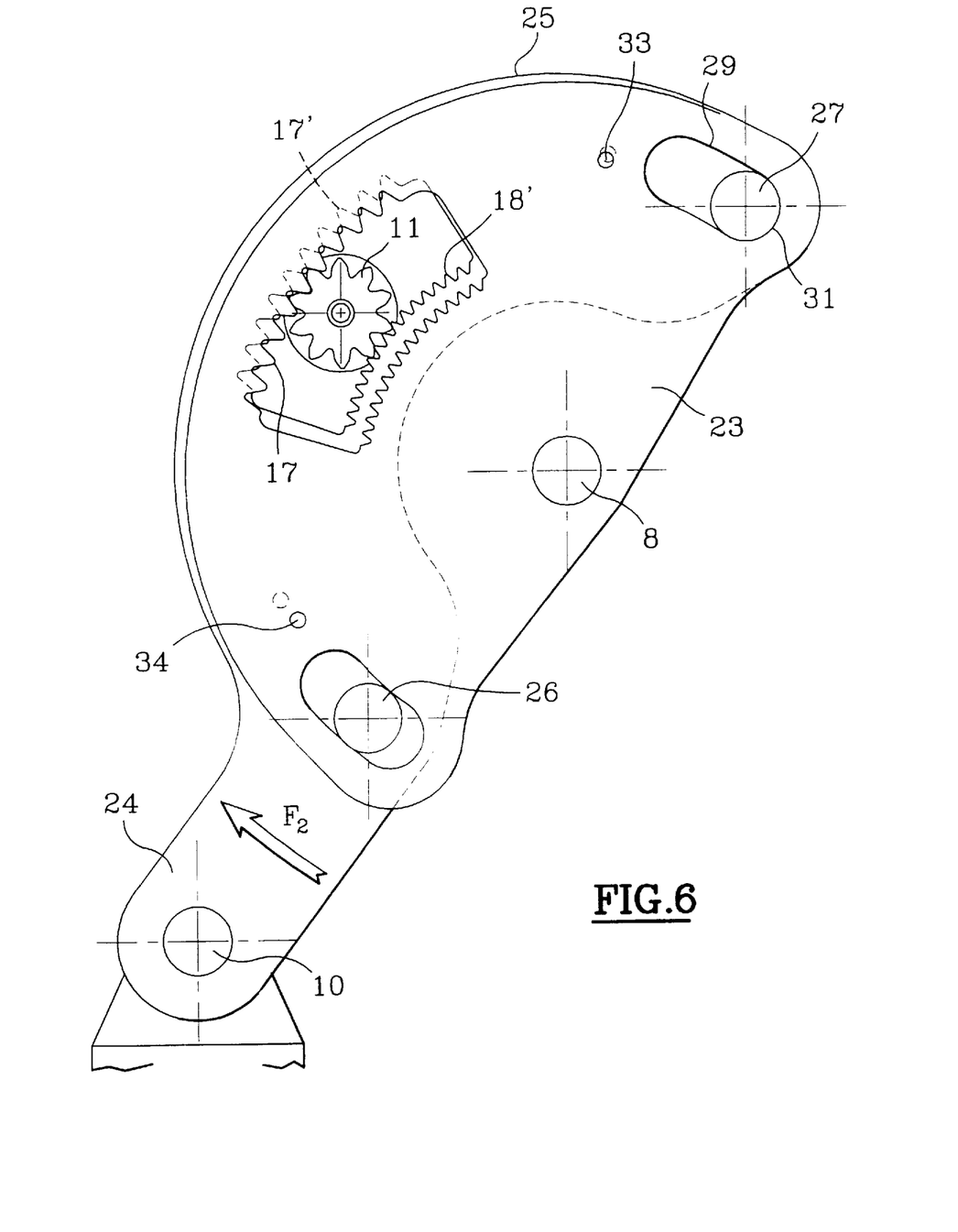
FIGS. 6 and 7 show the mechanism locked after such a shock, for a load on the arm in one direction then in the other direction respectively.
Figure 7:
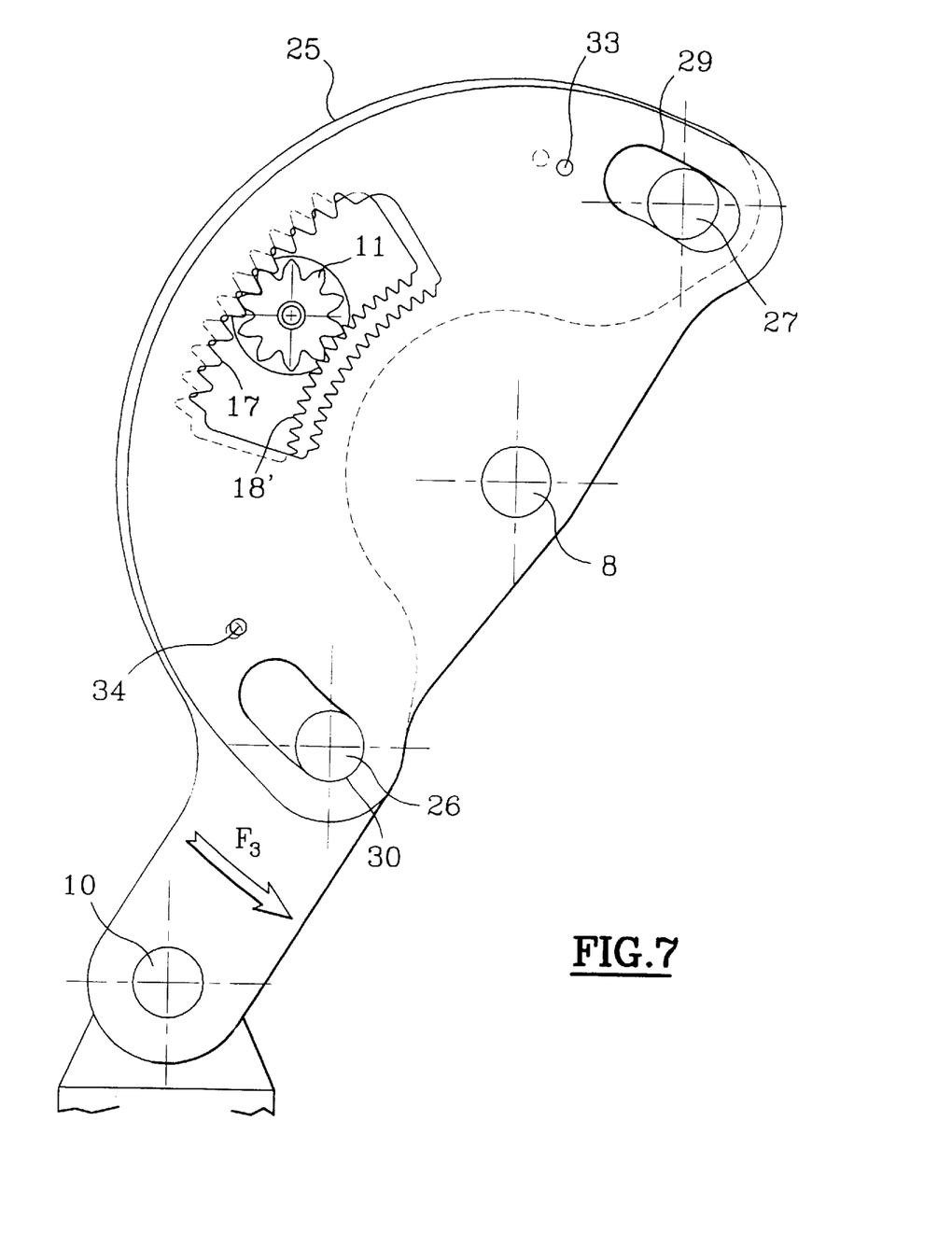

The design which we will now describe in relation to FIGS. 5 to 7 allows to get round the need for such a specific installation of the pinion.

In this design, the first element 23 has a general half-disc shape with hinge pin 8 as its centered and the second element 24 is in the shape of a sickle with a half-circle portion 25 which extends to against the first element, more or less corresponding with the periphery of the said half-disc.

The two elements include windows 16, 16' similar to those described in relation to the first design. These windows are located in the center part of the first element 23 and in the half-circle portion 25 of the second element 24.

In this design, the mechanism includes two pivots 26, 27 connecting the two elements, located respectively on either side of the center plane passing through hinge shaft 8 and the center of the windows 16, 16'. In the example shown, the two pivots are attached to the second element 24, the first pivot 26 being located more or less in line with the hinge shafts 8 and 10 and between these, as pivot 15 in the first design, and the second pivot 27 is located near the end of the half-circle portion 25, more or less diametrically opposite the pivot 26 in relation to hinge point 8. These two pivots pass respectively through the oblong holes 28, 29 made in the first element 23. These oblong holes are curved, each one having for center of curvature the axis of the pivot passing through the other hole and, in the normal utilization position of the mechanism, the pivots 26 and 27 are held against one end 30, respectively 31, of the oblong holes, located on the same side as the said holes in relation to the arm, for example the ends of the oblong holes located towards the edge 32 of the first element opposite the area where windows 16, 16' are located.

The two elements 23, 24 are also attached in this position by two shear pins 33, 34 fitted into the holes made in the said elements, as in the first design, and located respectively in the vicinity of the pivots 26, 27.

In the case of a shock inducing a load in excess of the normal on the lower end of the arm, in the direction of the arrow F2, the second element 24 will pivot around the second pivot 27 which will remain against the end 31 of the oblong hole 29, shearing the shear pin 34, the first pivot 26 moving in its oblong hole 28, until the secondary set of teeth 18' of the second element comes into contact with the pinion 11 and prevent it from rotating.

If the load is exerted in the other direction (arrow F3) as shown on FIG. 7, the second element then pivots around the first pivot 26 which remains in contact with the end 30 of the elongated hole 28, the cotter pin 33 being sheared and the second pivot 27 moving in the elongated hole 29 until the secondary set of teeth 18' of the second element comes into contact with the pinion 11 and prevents it from rotating.

In this second design, note that irrespective of the relative pivoting direction of the two elements, it is always the secondary set of teeth 18' of the second element 24 which moves to block the pinion 11, which always remains meshed with the main set of teeth 17 of the first element 23 and therefore at a fixed distance from hinge shaft 8. There is therefore no need for the attachment of the pinion 11 to the seat to be deformable. Also, there is no longer the need to make an external set of teeth on the first element. The internal set of teeth 17' of the second element, which is no longer indispensable, can however be conserved to complement the main set of teeth 17 of the first element during the normal service of the mechanism.

Note again that, on account of the different lengths of the lever arms brought into play according to the direction of the load exerted, the shear strengths of the two shear pins 33 and 34 must be different if we wish the locking of the mechanism to be achieved for the same load intensity irrespective of its direction. In addition, it will also be taken into account when these shear pins are designed that if one of the cotter pins is completely sheared during the relative pivoting of the two elements, the other shear pin will also undergo partial shearing as can be seen on FIGS. 6 and 7 due to the fact that it is not on the pivoting axis.

The invention is not limited to the designs described above only as examples. In particular, the relative position of the hinge shaft, pivots and sets of teeth can be modified without falling outside the scope of the invention as defined in the claims. It is also possible to replace the shear pins mentioned above by other connecting components ensuring the attachment of the two elements of the arm under normal load and allowing their relative pivoting beyond a predetermined load threshold such as, for example, corresponding stampings or half-cutouts made in the metal sheets constituting the elements and inserting one into the other, or other connecting parts with a predetermined rupture load. Also, one of the two elements 13 and 14 can be shaped so as to correctly ensure the transmission of the loads in a plane and avoid overhangs at level of pivot 15 and pinion 11 and the risk of deflection of the sheets forming the said elements, for example by making it in the form of two sheets placed respectively on either side of the second element.

I claim:

1. An angular position arm adjusting mechanism comprising: an arm hinged on a support around a hinge shaft of the type including a toothed circular segment attached to the said arm and meshing with one pinion installed so as to rotate on the said support, the arm formed of two elements connected by at least a pivot with axis parallel to a hinge axis and with at least one connecting member with a predetermined strength so that the connection assured by the said connecting member is broken when the pivoting torque of one of the said elements in relation to the other, around the said pivot, exceeds a predetermined threshold, and in that at least one of the said elements includes a main set of teeth in the form of an arc of a circle with its center of curvature located at the hinge shaft and at least another element includes a second set of teeth in the form of an arc of a circle with same center, the pinion being located between the two sets of teeth, the radial distance between the said sets of teeth being determined so that the pinion meshes only with the main set of teeth when the two elements of the arm are securely connected, and that the second set of teeth meshes with the pinion subsequent to relative pivoting of the two said elements when the connection ensured by the connecting member is broken.

2. Mechanism in accordance with claim 1, wherein the main set of teeth is an internal set of teeth, located on the other side of the hinge shaft with respect to the pinion.

3. Mechanism in accordance with one of the claims 1 or 2, wherein each of the elements of the arm includes an internal set of teeth and an external set of teeth, the two internal sets of teeth and the two external sets of teeth being located respectively so as to exactly correspond, one beside the other, when the two elements are connected together by the connecting member.

4. Mechanism in accordance with claim 3, wherein the internal and the external sets of teeth of a given element are made respectively on the opposite curved sides of a window in the form of an arc of a circle made in the said element.

5. Mechanism in accordance with claim 1, wherein the teeth of the second set of teeth are smaller than the teeth of the main set of teeth.

6. Mechanism in accordance with claim 1, wherein the pinion is installed on the support by deformable attaching means.

7. Mechanism in accordance with claim 1, wherein the two arm elements are connected by two pivots located on either side of a plane (P) passing via the hinge shaft and the sets of teeth, each of the said pivots being connected to one of the elements and having the possibility of relative movement in relation to the other element along a trajectory in the form of an arc of a circle centered on the other pivot.

8. Mechanism in accordance with claim 7, wherein it includes two connecting components associated respectively with each pivot.

9. Mechanism in accordance with claim 7, wherein the two pivots are attached to one of the elements and pass through elongated holes made in the other element.

10. System for adjusting the height of an automobile vehicle seat including a pivoting arm hinged on one hand to the seat and on the other hand to the floor or a slide of the vehicle wherein it includes a mechanism for adjusting the angular position of the said arm in accordance with any of the claims 1–2 to 4–9.

11. System for adjusting the height of an automobile vehicle seat including a pivoting arm hinged on one hand to the seat and on the other hand to the floor or a slide of the vehicle wherein it includes a mechanism for adjusting the angular position of the said arm in accordance with claim 3.

* * * * *